United States Patent Office 3,746,509
Patented July 17, 1973

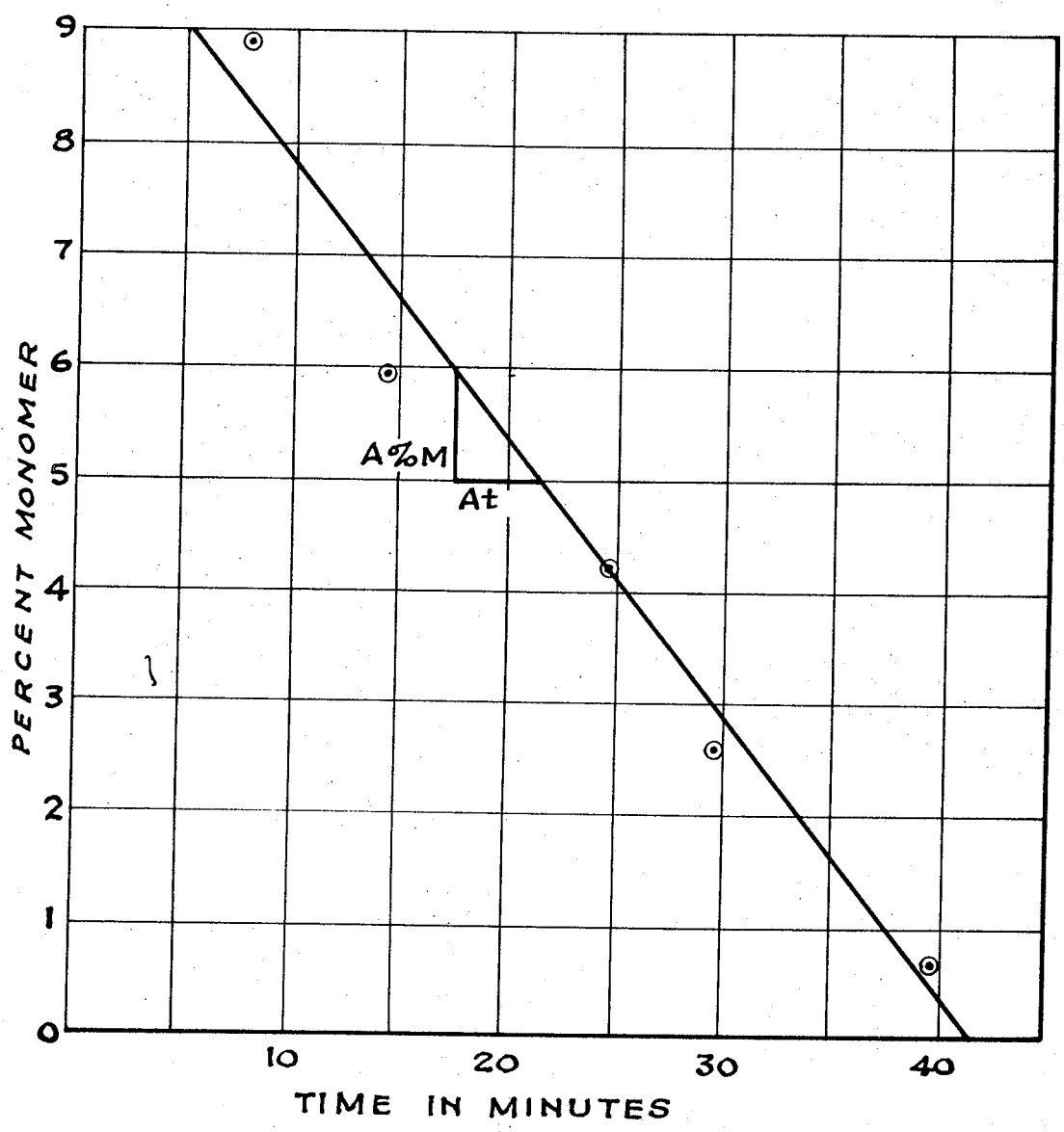

3,746,509
GAS CHROMATOGRAPHY ANALYSIS OF POLYMER
Larry P. Koskan, Orland Park, Ill., assignor to Nalco Chemical Company, Chicago, Ill.
Filed Sept. 20, 1971, Ser. No. 182,031
Int. Cl. G01n 31/08
U.S. Cl. 23—230 R                2 Claims

ABSTRACT OF THE DISCLOSURE

Gas-liquid chromatographic process to determine the reaction rate of a vinyl addition polymerization process.

INTRODUCTION

This invention concerns a gas-liquid chromatographic process to determine the reaction rates of vinyl addition polymerization processes. This invention relates to a particular type of vinyl addition polymerization process. These processes are well known to the art. These include an emulsion method, the inverse emulsion method, the suspension method, and the inverse suspension method. All of these methods have a disadvantage, namely, that there is no simple way to determine and control the reaction rate.

The most important factor in producing high performance polymers of acceptable molecular weight is proper control of the reaction rate. A slow reaction rate results in a low molecular weight polymer having poor quality. A reaction which proceeds at an excessively high rate will result in very large molecular weights, these too being a poor quality product.

The usual device to control the rate of reaction is temperature control. The temperature can be adjusted by several methods. Obviously, the temperature of the reaction may be raised or lowered by adjusting the heat supply to the reactor. Secondly, the vacuum on the reactor may be broken, thus causing a cooling effect and decrease in reaction rate. Thirdly, a controlled air leak may be permitted to enter into the reactor; thus causing a decrease in the reaction rate.

Thus, what is desired is a simple process to quickly determine the reaction rate during the course of the reaction. Then an almost instantaneous adjustment can be made to achieve the desired reaction rate.

OBJECTS

An object of this invention is to provide a method for improved control in a vinyl addition polymerization process.

Another object of this invention is to provide a method for the determination of reacted monomer in a vinyl addition polymerization process.

A further object of this invention is to provide a method for the determination of the reaction rate in a vinyl addition polymerization process.

Further objects will be disclosed herein.

THE INVENTION

This invention relates to a gas-liquid chromatographic process to determine the reaction rate of vinyl addition polymerization processes. Typical polymerization methods are described in U.S. Pats. 3,284,393 and 3,282,874.

U.S. Pat. 3,284,393 is a water-in-oil emulsion system. This system involves the formation of an emulsion by the addition of a monomer phase to an oil phase containing an emulsifying agent. The monomer phase is comprised of a water-soluble ethylenic unsaturated monomer in an aqueous solution. The oil phase is any inert hydrophobic liquid such as hydrocarbons and substituted hydrocarbons. Any emulsifying agent which is oil soluble is acceptable.

In accordance with this invention, all known polymerizable water-soluble ethylenic unsaturated monomers the polymers of which are insoluble in the continuous oil phase can be polymerized by a water-in-oil emulsion polymerization process to give a polymeric latex. Such monomers have a water solubility of at least 5 weight percent and include acrylamide, methacrylamide, acrylic acid, methacrylic acid, vinylbenzyl dimethylammonium chloride, alkali metal and ammonium salts of 2-sulfoethylacrylate, ar-sodium styrene sulfonate, 2-aminoethylmethacrylate hydrochloride, alkali metal and ammonium salts of vinylbenzyl sulfonates and the like. When aqueous solutions of the monomers are used, they can be varied widely in monomer content. Proportions between 100 and 5 percent by weight monomer correspondingly to 0 to 95 pecent water are used, depending upon the monomer and the temperature of polymerization. The ratio of monomer phase to oil phase is also widely variable, advantageously between 30 and 70 parts of the former to between 70 and 30 parts of the latter by weight. A monomer phase to oil phase ratio of about 70 to 30 is preferred.

In order to emulsify the monomer phase into the oil phase to give a water-in-oil emulsion, an emulsifying agent of the water-in-oil type is used in amount ranging between 0.1 and 10 percent by weight of the oil phase. Any conventional water-in-oil emulsifying agent can be used, such as hexadecyl sodium phthalate, sorbitan monooleate, sorbitan monostearate, cetyl or stearyl sodium phthalate, metal soaps, and the like.

The oil phase can be any inert hydrophobic liquid which can readily be separated from the disperse phase polymeric product.

A preferred group of organic liquids are the hydrocarbon liquids which include both aromatic and aliphatic compounds. Thus, such organic hydrocarbon liquids as benzene, xylene, toluene, mineral oils, kerosenes, naphthas and, in certain instances, petrolatums may be used. A particularly useful oil from the standpoint of its physical and chemical properties is the branch-chain isoparaffinic solvent sold by Humble Oil and Refining Company under the trade name "Isopar M." Typical specifications of this narrow-cut isoparaffinic solvent are set forth below in Table I:

TABLE I

| Specification properties | Minimum | Maximum | Test method |
|---|---|---|---|
| Gravity, API at 60/60° F | 48.0 | 51.0 | ASTM D287 |
| Color, Saybolt | 30 | | ASTM D156 |
| Aniline point, ° F | 185 | | ASTM D611 |
| Sulfur, p.p.m | | 10 | ASTM D1266 [a] |
| Distillation, ° F.: | | | |
| IBP | 400 | 410 | ASTM D86 |
| Dry point | | 495 | |
| Flash point, ° F. (Pensky-Martens closed cup). | 160 | | ASTM D93 |

[a] Nephelometric mod.

Free radical yielding initiators useful in polymerizing ethylenic unsaturated monomers, such as benzoyl peroxide, lauroyl peroxides, 2,2′-azobis(isobutyronitrile), potassium persulfate and the like are used in the polymerization, advantageously in amounts ranging between 0.002 and 0.2 percent by weight of the oil or monomer phase, depending upon the solubility of the initiator. Polymerization can also be carried out using high energy irradiation, e.g., gamma irradiation from $CO^{60}$, or high energy electrons from a Van de Graaff accelerator, etc., or ultraviolet irradiation.

Elevated reaction temperatures, advantageously between 40° and 70° C., are used with free radical yielding initiators. Within such a temperature range, conversion is substantially complete in from one-half hour to several days, depending upon monomer and reaction variables. High energy or ultraviolet irradiation polymerization is carried out at room temperature or above or below room temperature, as desired.

U.S. Pat. 3,282,874 is a water-in-oil inverse suspension system. This system involves the fact that aqueous solutions of water-soluble unsaturated monomer, and mixtures thereof can be suspended in an oil phase to form a suspension of globules ranging between 10 microns and 2 mm. in diameter and polymerized therein to give polymeric products in bead form having a controlled size.

A water-in-oil suspending agent is dissolved or suspended in an oil phase. An aqueous solution of monomer or mixed monomers is added to the oil phase with vigorous agitation until the aqueous solution is suspended in the oil phase as globules ranging between 10 microns and 2 mm. in diameter.

The reaction temperature is then raised to between 20° and 100° C. with continued mild agitation to prevent separation of phases or adhesion of polymer beads. Polymerization is initiated by an added free radical generator or by ultraviolet or X-radiation. The reaction is continued, generally with mild agitation, until conversion is substantially complete. Polymeric beads are thereby formed, which are separated from the reaction medium, washed and dried.

The suspending agent is a solid or liquid substance having a low hydrophile-lyophile balance, i.e., is preponderantly hydrophobic. Inorganic hydroxy-oxides having substituent hydrocarbonylsilyl, hydrocarbonylsilylene or hydrocarbonylsilylidine radicals are particularly useful suspending agents. Other useful solid suspending agents include low hydrophile-lyophile kaolin treated with rosin amine, bentonite treated with organic ammonium cation yielding reagents, etc.

All known water-soluble unsaturated monomers can be polymerized by the inverse suspension polymerization process of this invention. Such monomers include acrylamide, methacrylamide, acrylic acid, methacrylic acid, vinylbenzyl trimethylammonium chloride, alkali metal and ammonium salts of 2-sulfoethylacrylate, 2-aminoethyl methacrylate hyrochloride, alkali metal and ammonium salts of vinylbenzyl sulfonate, etc. Aqueous solutions of the monomers to be polymerized can be varied widely in monomer content, i.e., from about 5 to 80 weight percent percent of monomer in water, depending upon the monomer and the polymerization temperature. The ratio of aqueous monomer phase to oil phase is also widely variable, advantageously from about 5 to 75 weight parts of aqueous phase to 95 to 25 parts of oil phase.

The oil phase can be any inert hydrophobic liquid which can be separated readily from the polymeric product. Of such liquids the hydrocarbons and chlorinated hydrocarbons such as toluene, xylene, o-dichlorobenzene, monochlorobenzene, propylene dichloride, carbon tetrachloride, etc. are advantageously used. Toluene and xylene are preferred as oil phase liquids.

The reaction time is widely variable depending upon the catalyst system, and ranges generally between about 10 minutes and two hours at temperatures between about 20° and 100° C.

This invention involves the determination of the monomer reacted in one of these typical polymerization reactions. Once the reacted monomer is determined, the reaction rate may be calculated. Specifically, the monomer concentration determination consists of the following steps:

(A) The sample must be removed from the polymerization reactor and be accurately weighed. The size of the sample should range between 10 and 40 grams, with the preferred size being approximately 20 grams.

(B) To the sample in A is added from 25 to 120 grams of an organic solvent having from 1 to 8 carbon atoms from the group consisting of aldehydes, ketones, alcohols, or a mixture thereof. The preferred hydrocarbon solvents are acetone, methanol, ethanol, isopropanol, or a mixture of any of them. The preferred organic solvent size ranges between 50 and 60 milliliters.

(C) From 0.5 to 5.0 grams of a dilute mineral acid is then added to the sample. The preferred dilute mineral acid is 6 N HCl. The preferred weight of dilute mineral acid is 1 gram.

(D) A precisely determined sample ranging between 0.5 and 5.0 $\mu$l. of the sample prepared in (C) is then injected into a liquid-gas chromatograph. The preferred sample size is 2 $\mu$l.

(E) The monomer concentration is determined by calculating the area under the monomer peak as compared to an external standard.

(F) The polymerization rate is calculated using the formula:

$$\frac{\Delta M}{\Delta t}(c) = \text{reaction rate}$$

wherein:

$\Delta M$ is change in monomer concentration from time zero;
$\Delta t$ is the time from when the reaction started;
$c$ is the mole/liter conversion constant for the monomer.

EQUIPMENT

The equipment used in this invention involves a standard gas chromatograph with a flame ionization detector. Standard accessories for the chromatograph consists of a recorder, $N_2$ gas, $H_2$ gas, an air supply, and integrator. The column is a strainless steel column 6' long with an 1/8" outside diameter. These units are well known to the art and are described in detail in the literature.

Specifically, the unit used in this invention was one produced by Varian Associates.

MONOMER CONCENTRATION AND REACTION RATE

The monomer concentration of an unknown sample is determined by comparing the area under the chromatographic peak of the unknown sample to that of known concentration samples.

Once the monomer concentration has been determined the reaction rate is calculated by taking the change in monomer concentration during the reaction from time zero to the time when the reaction is completed; and multiply this ratio by the mole/liter conversion constant for the monomer. This mole/liter conversion constant is merely the conversion of the concentration of the monomer expressed in terms of gram/100 ml. to moles/liter.

This invention is more readily described by the following illustrative example.

Example I

The gas chromatograph unit used was one manufactured by Varian Associates. This is a standard gas chromatograph with a flame ionization detector. Standard accessories for the chromatograph included a recorder, $N_2$ gas, $H_2$ gas, an air supply, and an integrator. The column was 6" long with 1/8" outside diameter. The column was made of stainless steel. The column packing consisted of 20% Carbowax 20M TPA (terephthalic acid) on 80/100 Chrom. W DMCS A/W (dimethchloro silanized, acid washed). The liquid phase was Carbowax 20M terephthalic acid. The solid support of the packing was dimethylchlorosilanized and acid washed. The oven temperature was set in the range between 185°–210° C. The injection port temperature was set in a range between 270°–300° C. The $N_2$ carrier gas flow rate was set at 25 cc./min. The air flow rate was set at 0.75 c.f.h. The hydrogen flow rate was set at 25 cc./min. The detector temperature was 200° C.

Samples of the acrylamide reaction mix were taken at different times during the reaction and the percent acrylamide monomer was determined by use of the gas chromatograph. FIG. 1 shows the plot of percent monomer versus time.

The reaction rate was calculated as follows:

(1) $$\frac{\Delta \text{ percent monomer}}{\Delta \text{ time}} (c) = \text{reaction rate}$$

$\Delta$ percent monomer = $\Delta$(grams/100 ml.) monomer (2) $$c = \frac{1}{\text{molecular weight of acrylamide (grams/mole)}} \times \frac{1000 \text{ ml.}}{1 \text{ liter}}$$

$$c = \frac{1 \text{ mole}}{\text{molecular weight grams}} \times \frac{1000 \text{ ml.}}{1 \text{ liter}}$$

$$= \frac{1000 \text{ (mole-ml.)}}{\text{molecular weight (grams-liter)}}$$

$$c = \frac{1000 \text{ mole-ml.}}{71.08 \text{ grams-liter}} = 14.1 \frac{\text{mole-ml.}}{\text{grams-liter}}$$

(3) $$\frac{\Delta \text{ (grams/100 ml.) monomer}}{\Delta \text{ minutes}} \times 14.1 \frac{\text{mole-ml.}}{\text{grams-liter}}$$

$$= \text{reaction rate} = \frac{(6-5) \frac{\text{grams}}{100 \text{ ml.}}}{(21.5 - 17.5) \text{ minutes}}$$

$$\times 14.1 \frac{\text{moles-ml.}}{\text{grams-liter}} = \frac{1}{400 \text{ minutes}} \times 14.1 \frac{\text{mole}}{\text{liter}}$$

Reaction rate = $0.0352 \frac{\text{mole}}{\text{liter-minute}}$

I claim:

1. A gas-liquid chromatographic method for the determination of the monomer concentration and the reaction rate in a water-in-oil polymerization process; said method consisting of the following steps:

(A) obtain an accurately weighed sample in the range between 10 and 40 grams for the polymerization reaction;

(B) add from 25 to 12 grams of an organic solvent having from 1 to 8 carbon atoms from the group consisting of aldehydes, ketones, alcohols, or a mixture thereof;

(C) add from 0.5 to 5.0 grams of a dilute mineral acid;

(D) inject a precisely determined sample ranging between 0.5 and 5.0 µl. of the composition of (C) into a liquid-gas chromatograph and passing said composition through said chromatograph having connected thereto an integrator, producing on said integrator a curve under which the area can be calculated;

(E) determine the monomer concentration by calculating the area under the curve as compared to a known standard;

(F) calculate the polymerization rate using the following formula:

$$\frac{\Delta M}{\Delta t} (c) = \text{reaction rate}$$

where:
(1) $\Delta M$ is the change in monomer concentration from time zero;
(2) $\Delta t$ is the time from when the reaction started; and
(3) $c$ is the mole/liter conversion constant for the monomer.

2. A gas-liquid chromatographic method for the determination of the monomer concentration and the reaction rate in a water-in-oil polymerization process; said method consisting of the following steps:

(A) obtain a 20 gram sample from the polymerization reaction;

(B) add 50 grams of acetone;

(C) add 1.0 grams of 6 N hydrochloric acid;

(D) injection 2 µl. of the composition of (C) into a liquid-gas chromatograph and passing said composition through said chromatograph having connected thereto an integrator, producing on said integrator a curve under which the area can be calculated;

(E) determine the monomer concentration by calculating the area under the curve as compared to a known standard;

(F) calculate the polymerization rate using the following formula:

$$\frac{\Delta M}{\Delta t} (c) = \text{reaction rate}$$

where:
(1) $\Delta M$ is the change in monomer concentration from time zero;
(2) $\Delta t$ is the time from when the reaction started; and
(3) $c$ is the mole/liter conversion constant for the monomer.

References Cited
UNITED STATES PATENTS

| | | | |
|---|---|---|---|
| 3,527,926 | 9/1970 | Holy. | |
| 3,559,455 | 2/1971 | Karasek | 73—23.1 |
| 3,649,200 | 3/1972 | Moore | 23—253 A |

MORRIS O. WOLK, Primary Examiner

R. E. SERWIN, Assistant Examiner

U.S. Cl. X.R.

23—230 A, 232 C